United States Patent
Huang et al.

(10) Patent No.: US 6,963,924 B1
(45) Date of Patent: Nov. 8, 2005

(54) IP ROUTING LOOKUP SCHEME AND SYSTEM FOR MULTI-GIGABIT SWITCHING ROUTERS

(76) Inventors: Nen-Fu Huang, No.10, Alley 3, Lane 6, Fu Chung St., Hsinchu (TW); Shi-Ming Zhao, No.10, Alley 3, Lane 6, Fu Chung St., Hsinchu (TW)

(*) Notice: Subject to any disclaimer, the term of this patent is extended or adjusted under 35 U.S.C. 154(b) by 0 days.

(21) Appl. No.: 09/240,833

(22) Filed: Feb. 1, 1999

(51) Int. Cl.[7] .................................... G06F 15/16
(52) U.S. Cl. .................. 709/238; 370/254; 707/101
(58) Field of Search ................... 370/355, 392, 370/346, 254–257, 400, 445; 709/238, 245, 709/247; 711/206, 212, 220; 707/3, 10, 101, 707/102

(56) References Cited

U.S. PATENT DOCUMENTS

| | | | | |
|---|---|---|---|---|
| 5,917,820 | A | * | 6/1999 | Rekhter ..................... 370/392 |
| 6,014,659 | A | * | 1/2000 | Wilkinson et al. ............. 707/3 |
| 6,018,524 | A | * | 1/2000 | Turner et al. ............... 370/392 |
| 6,061,712 | A | * | 5/2000 | Tzeng ........................ 709/202 |
| 6,067,574 | A | * | 5/2000 | Tzeng ........................ 709/247 |
| 6,141,738 | A | * | 10/2000 | Munter et al. ............... 711/206 |
| 6,266,706 | B1 | * | 7/2001 | Brodnik et al. ............. 709/242 |
| 6,434,144 | B1 | * | 8/2002 | Romanov ................... 370/392 |
| 6,546,391 | B1 | * | 4/2003 | Tsuruoka ........................ 707/8 |

OTHER PUBLICATIONS

"A Slot Interleaved Multiple Access Scheme for DQDB Metropolitan Area Networks," by N-F Huang, IEEE, 1993.*

"The Strongly Connecting Problem on Multihop Packet Radio Networks," by N-F Huang, IEEE, 1989.*

Gupta et al., "Routing Lookups in Hardware at Memory Access Speeds," Apr. 1998, Seventeenty Annual Joint Conference of the IEEE Computer and Communications Societies, IEEE, vol. 3, pp. 1240-1247.*

Nilsson et al., "Fast Address Lookup for Internet Routers," 1998, from IFIP 4th International Conference on Broadband Communications, pp. 11-22, printed from http://www.nada.kth.se/~snilsson/public/papers/router/.*

* cited by examiner

*Primary Examiner*—Bradley Edelman
(74) *Attorney, Agent, or Firm*—Dickinson Wright, PLLC (57) ABSTRACT

An IP routing lookup scheme and system for a multi-gigabit switching router which can reach 3 memory accesses in the worst case using memory size less than 512 KB is disclosed. The invention can compress a routing table with 40,000 routing entries into a forwarding table of 450–470 Kbytes. According to the present invention, a segmentation table storage device stores a next hop or a pointer for looking up a next hop for an incoming packet having prefix length less than or equal to 16 bits. The Next Hop Array storage device is for storing the next hops for a packet having prefix length larger than 16 bits and offset length less than or equal to 3 bits. A Compressed Next Hop Array storage device is encoded and decoded according to a Code Word Array storage device. The Compressed Next Hop Array storage device stores next hops for the incoming packet having prefix length larger than 16 bits and offset length larger than 3 bits. Thus, in the worst case, an output port for a route prefix can be found in 3 memory accesses.

20 Claims, 11 Drawing Sheets

Next Hop Array

| 2 | 2 | 2 | 2 | 2 | 2 | 2 | 2 | 8 | 8 | 8 | 8 | 8 | 8 | 8 | 8 | 8 | 8 | 8 | 8 | 8 | 8 | 7 | 7 | 7 | 7 | 6 | 6 | 6 | 6 | ••••••••• | 2 | 2 | 2 | 2 |

Fig.7A

Compression Bit Map

| 1 | 0 | 0 | 0 | 0 | 0 | 0 | 0 | 1 | 0 | 0 | 0 | 0 | 0 | 0 | 0 | 0 | 0 | 0 | 0 | 0 | 0 | 1 | 0 | 0 | 0 | 1 | 0 | 0 | 0 | ••••••••• | 1 | 0 | 0 | 0 |

Fig.7B

Compressed Next Hop Array

| 2 | 8 | 7 | 6 | ••••••••• | 2 |

IP ROUTING LOOKUP SCHEME AND SYSTEM FOR MULTI-GIGABIT SWITCHING ROUTERS

BACKGROUND OF THE INVENTION

A. Field of the Invention

The present invention relates to an IP (Internet Protocol) routing lookup scheme and system for multi-gigabit switching routers, especially to an IP routing lookup scheme and system which can guarantee 3 memory accesses in the worst case using a memory size less than 512 KB. Moreover, we can improve the performance of multi-gigabit switching routers greatly by pipeline skill in hardware.

B. Description of the Prior Art

Figure 1:
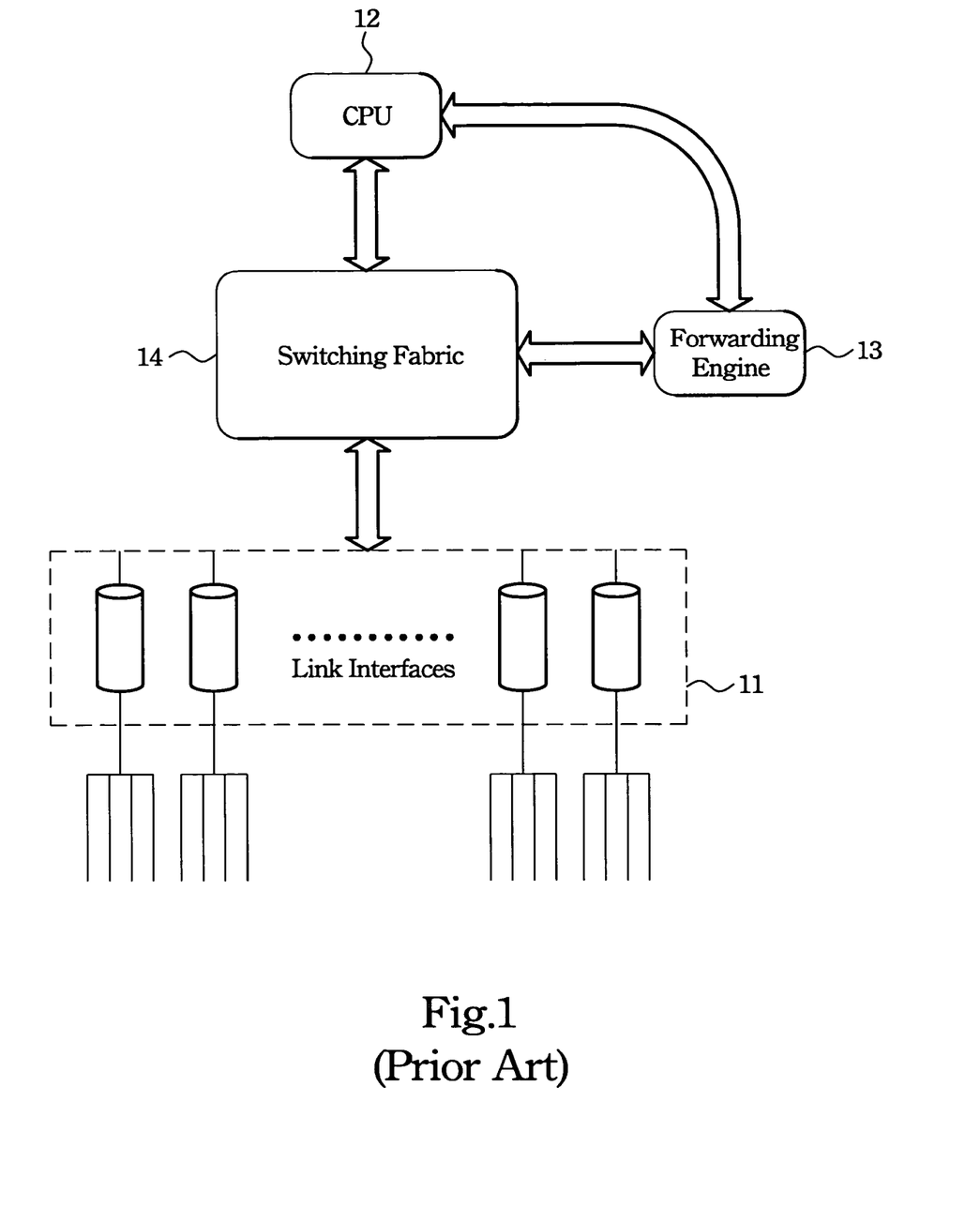
FIG. 1 is a schematic diagram showing the architecture of a conventional multi-gigabit switching router.

The architecture of a multi-gigabit IP switching router is schematically shown in FIG. 1. It mainly includes a number of link interfaces 11, a CPU module 12, and a forwarding engine 13 interconnected with a switching fabric 14. The forwarding engine 13 employs a forwarding database which is a local version of the routing table downloaded from the CPU module 12 to make the routing decision. Although the routing updates may occur frequently, it is not necessary to download a new forwarding database for each routing update.

The CPU module 12 executes the routing protocols, such as RIP and OSPF, and needs a dynamic routing table for fast updates and fast generation of forwarding databases. For this reason, the forwarding database shall be optimized to furnish fast lookups.

Figure 2:
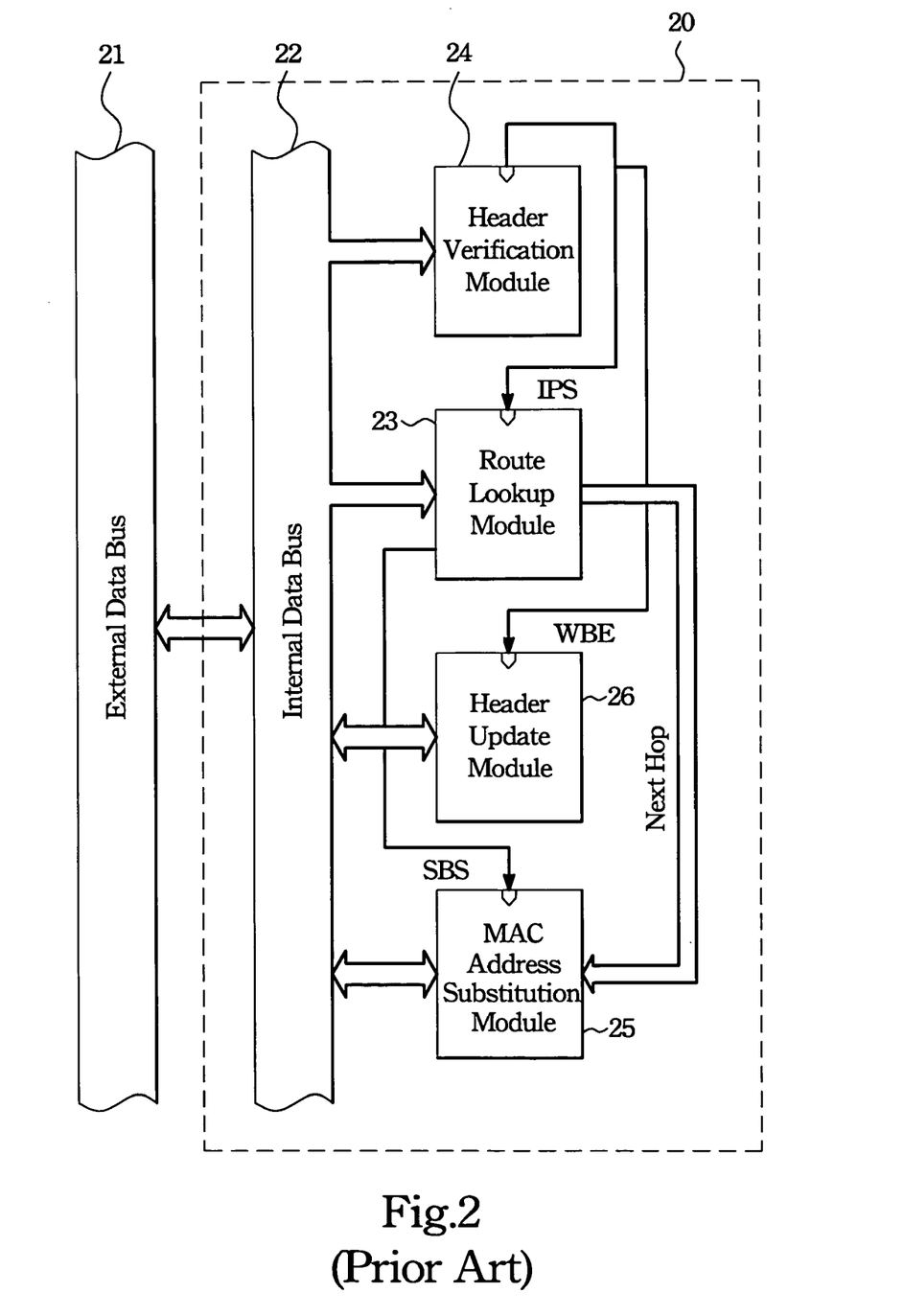
FIG. 2 is a block diagram showing the architecture of a Forwarding Engine with superscalar and pipeline design.

The architecture of a forwarding engine 13 with superscalar scalar and pipeline design is shown in FIG. 2. An incoming IP packet will be buffered in the external data bus 21. The external data bus 21 is coupled to an internal data bus 22 for processing the incoming IP packet in the forwarding module 20. The forwarding module 20 includes a route lookup module 23, a header verification module 24, a header update module 26 and a MAC address substitution module 25. The route lookup module 23 reads the destination IP address of the incoming packet from the internal data bus 22. The IP header of the incoming packet is forwarded to the header verification module 24 and the header update module 26 to process at the same time. If the IP header of the incoming packet is not correct, the packet will be dropped. The lookup is then terminated. If the IP header is correct, the header verification module 24 will send a signal to the header update module 26 to update the decreased value of TTL and the recalculated checksum of the incoming IP packet via the external data bus 21. The route lookup module 23 will then provide the next hop (port number) for the incoming IP packet. The MAC address substitution module 25 then substitutes the source MAC address and the destination MAC address of the incoming IP packet by the MAC address of the output interface 11 and the immediate next hop (a router or the destination host) respectively. Then, the incoming IP packet can be forwarded into the output interface 11 via the external data bus 21.

According to the architecture as shown in FIG. 2, the bottleneck is in the route lookup module 23 because the header verification module 24, the header update module 26, and MAC address substitution module 25 all communicate with the route lookup module 23 to get the information for the forwarding next hop. The design of the rout lookup module 23 will significantly affect the packet forwarding rates and also the traffic on the networks.

Recent approaches on improving the packet forwarding rates shows that the IP lookup scheme is a tradeoff issue between memory size and access times. For instance, the most straightforward lookup scheme is to have a forwarding database containing every next hop for each 32-bit IP address. In this case, it requires only one memory access for IP address lookup. However, the Next Hop Array for an IP address of 32-bits directly spread for exact matching will need 4 GB ($2^{32}$=4 GB).

Figure 3:
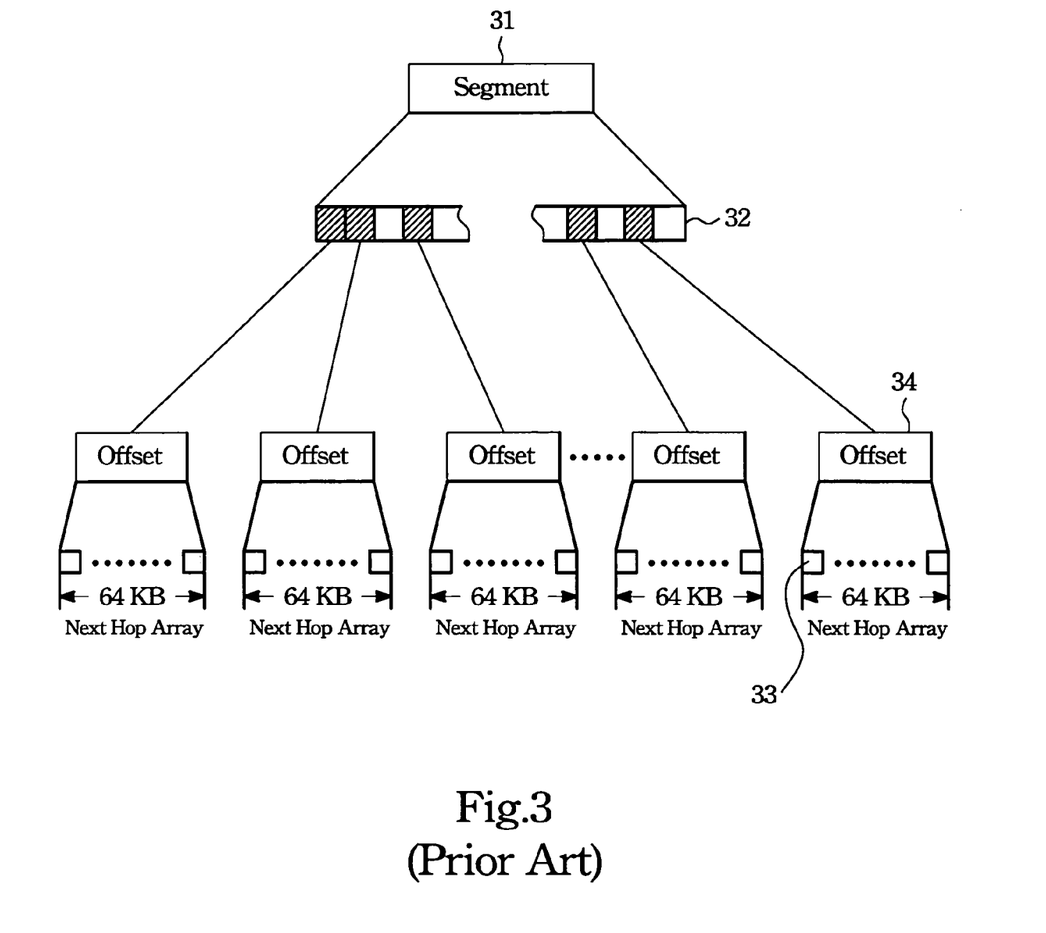
FIG. 3 is a schematic diagram showing the conventional method of indirect lookup.

In another case, an indirect lookup approach is employed to reduce the size of forwarding database. As illustrated in FIG. 3, each IP address is partitioned into two parts: segment (16-bit) 31 and offset (16-bit) 34. The Segmentation Table (32-bit) 32 based on the segment 31 has the size of 64K for storing 65536 ($2^{16}$) entries. If the value of the entry of the Segmentation Table 32 is smaller than 256 ($2^8$), then it records the next hop of the routing. If the value of the entry of the Segmentation Table 32 is larger than 255, then it stores a pointer pointing to the associated Next Hop Array 33 (hereinafter referred to as NHA). Each NHA 33 has the size of 64K ($2^{16}$). Each entry in the NHA 33 is 8-bit for recording the next hop (port number) of the destination IP address. Thus, for a destination IP address a.b.x.y, the segment a.b can be an index for looking up the Segmentation Table 32 while the offset x.y an index for looking up the associated NHA, if necessary. In other words, for a segment a.b, if the length of the longest prefix for this segment is less than or equal to 16 (the segment length), then the corresponding next hop can be found in the Segmentation Table 32 without having to access the associated 64 KB NHA. On the other hand, if the length of the longest prefix is greater than 16, then a pointer in the Segmentation Table 32 can be found to point to an associated 64 KB NHA 33. According to this routing lookup mechanism, the maximum number of memory accesses for an IP address lookup is two with reduced memory size. Nevertheless, its memory requirement is still too big. In the worst case, it requires memory space of 4×64 KB+64K×64 KB for the segmentation table plus the NHA.

Some approach provides a software-based solution which can compress a table of 40,000 entries into 150–160 Kbytes. However, when this software is implemented in hardware, the memory accesses for a lookup is 2 in the best case and 9 in the worst case. Another approach provides a large size DRAM for fast routing lookup. The maximum number of memory accesses for a lookup can be reduced to 2 but with a forwarding table of 33 Mbytes. If an intermediate length table is added, the forwarding table can be reduced to 9 Mbytes, but the maximum number of memory accesses for a lookup will be increased to 3.

Another approach provides a lookup scheme based on the binary search mechanism. It requires a worst case time of $\log_2$(address bits) hash lookups. Thus, 5 hash lookups are needed for IPv4 and 7 for IPv6 (128-bit). This software based binary search work is further improved by employing the cache structure and using the multiway and multicolumn search. For a database of N prefixes with address length W, the native binary search scheme takes O(W*logN) searches. This improved schemes takes only O(W+logN) searches. However, these software-based binary search schemes are not easy to be implemented in hardware.

SUMMARY OF THE INVENTION

Accordingly, it is a primary object of the present invention to provide a fast lookup scheme and system which requires no more than three memory accesses for looking up the forwarding next hop and can be implemented in a forwarding table less than 512 KB memory.

It is another object of the present invention to provide a fast lookup scheme and system which can perform longest prefix matching and require only a 512 KB memory implemented in a pipelined skill.

Briefly described, the steps of the inventive method comprises:

(a) partitioning each subnet IP address of a routing information into a segment and an offset with variable length;

(b) building a segmentation table based on the segment, and the segmentation table comprises two fields: a pointer/next hop, and an offset length, where from the value of the entry in the pointer/next hop field, we can determine if it is a next hop or a pointer, and the entry in the offset length field records the longest prefix length−S−1 (S is the bit-length of the partitioned segment) for the corresponding segment;

(c) constructing a plurality of Next Hop Arrays based on the offset with variable length;

(d) determining if the NHA needs to be compressed from the size of each NHA; if yes, then constructing a Compression Bit Map (CBM) for the NHA;

(e) constructing a Compressed Next Hop Array (CNHA) according to each CBM;

(f) converting each CNHA into a Code Word Array in which each code word comprises a base and a map;

(g) generating a next hop for the incoming packet according to the following looking up steps:

Using the segment of an incoming IP address as an index to look up the segmentation table. If the value of the first field (pointer/next hop) of the correspondent entry found in the segmentation table is less than a predetermined number, it indicates that the entry is a next hop. Otherwise, if the value of the first field of the correspondent entry found in the segmentation table is larger or equal to the predetermined number and the offset length in the correspondent entry plus 1 is smaller or equal to a threshold value, then it indicates that the entry is a pointer. So, following the pointer to find out the next hop in the Next Hop Array. And when the offset length in the correspondent entry plus 1 is larger than a threshold value, then it is a pointer pointing to a Code Word Array. In the following, the present invention provides a mechanism to get a code word (a base and map) of the Code Word Array. And the desired next hop can be found by decoding the code word.

According to the method described above, the invention can compress a routing table which has about 40K entries into a forwarding table of only 450 to 470 Kbytes. The implementation cost can therefore be reduced to the minimum, and the speed for looking up the table can also be increased. A preferred embodiment of the present invention preferably includes: a segmentation table storage device, a Next Hop Array storage device, a Compressed Next Hop Array storage device, and a Code Word Array storage device. The first 16 bits of the IP address of an incoming packet will be used as an index to lookup the segmentation table storage device. When the first 20 bits of the correspondent entry is a next hop, then we can get the next hop right away. Otherwise, the entry is a pointer pointing to a Next Hop Array or Code Word Array. When the value of the last four bits of the correspond entry plus one is less or equal to 3, using the value of the last four bits plus one as an offset to look up the Next Hop Array storage device. On the other hand, when the value of the last four bits plus one is larger then 3, then decode the Code Word Array that is pointed to by the pointer to look for the next hop stored in the CNHA storage device. Thus, in the worst case, a next hop for a route prefix can be found in three memory accesses. Moreover, the architecture of the inventive system can be implemented in a superscalar scalar and pipeline design, thereby to increase the speed of finding a next hop.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

Figure 4:
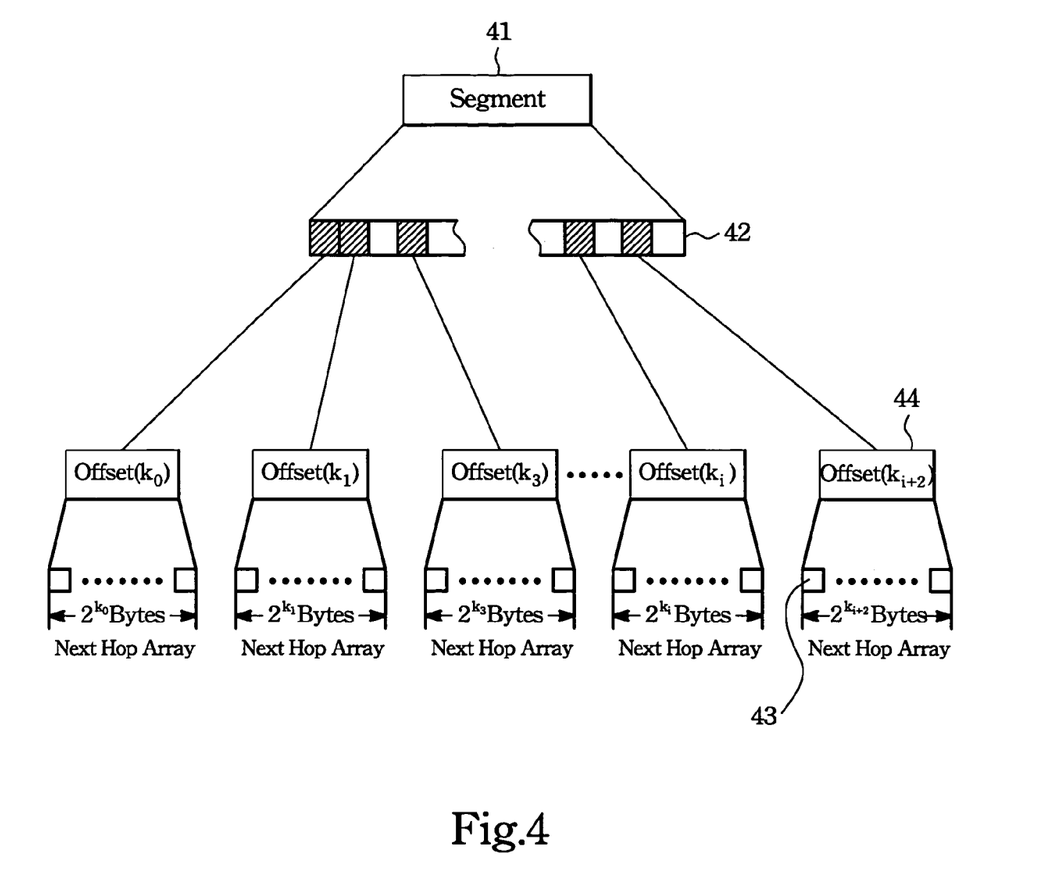
FIG. 4 is a schematic diagram showing the method of indirect lookup with variable offset length according to the preferred embodiment of the invention.

To further reduce the size of a NHA, the method of the present invention provides an indirect lookup mechanism with variable offset length as shown in FIG. 4. In contrast to the constant length of the offset in FIG. 3, the length of the offset depends on the longest prefix of an IP address. Thus, the length of the offset will be less or equal to 16. An IP address is partitioned into two fields: segment (16 bit) and offset ($\leq 16$ bit). The Segmentation table 42 based on the segment 41 is also 64K entries. Each entry of the Segmentation Table 42 is 24 bits. Each entry is divided into two fields: pointer/next hop (20-bit) field and offset length (4-bit) field. The pointer/next hop field records a next hop or a pointer pointing to the associated NHA 43. If the pointer/next hop field contains a value less than 256 (8 bits), then it is a next hop. On the other hand, if the field contains a number larger than 255, then it contains a pointer pointing to a memory location indicated by the offset. The value of the offset length field (4-bit)+1 indicates the length of the offset which is k bits (0≦k≦16). If the offset length field is of k-bit length, its associated NHA will have $2^k$ entries. Since k is less or equal to 16, so the offset of variable length can further save the memory space for NHA.

The offset length depends on the prefixes of each segment. For instance, a segment of an IP address a.b may have m prefixes. The longest prefix 1 is larger than 16 bits but less or equal to 32 bits. The offset length k for this segment will be (1–16) bits. In other words, for each destination IP address a.b.x.y, the segment a.b performs as the index for looking up the Segmentation Table 42 and the leftmost k bits of x.y (from 16-th bit to (16+k−1)-th bit) as the index for looking up the associated NHA.

Figure 5:
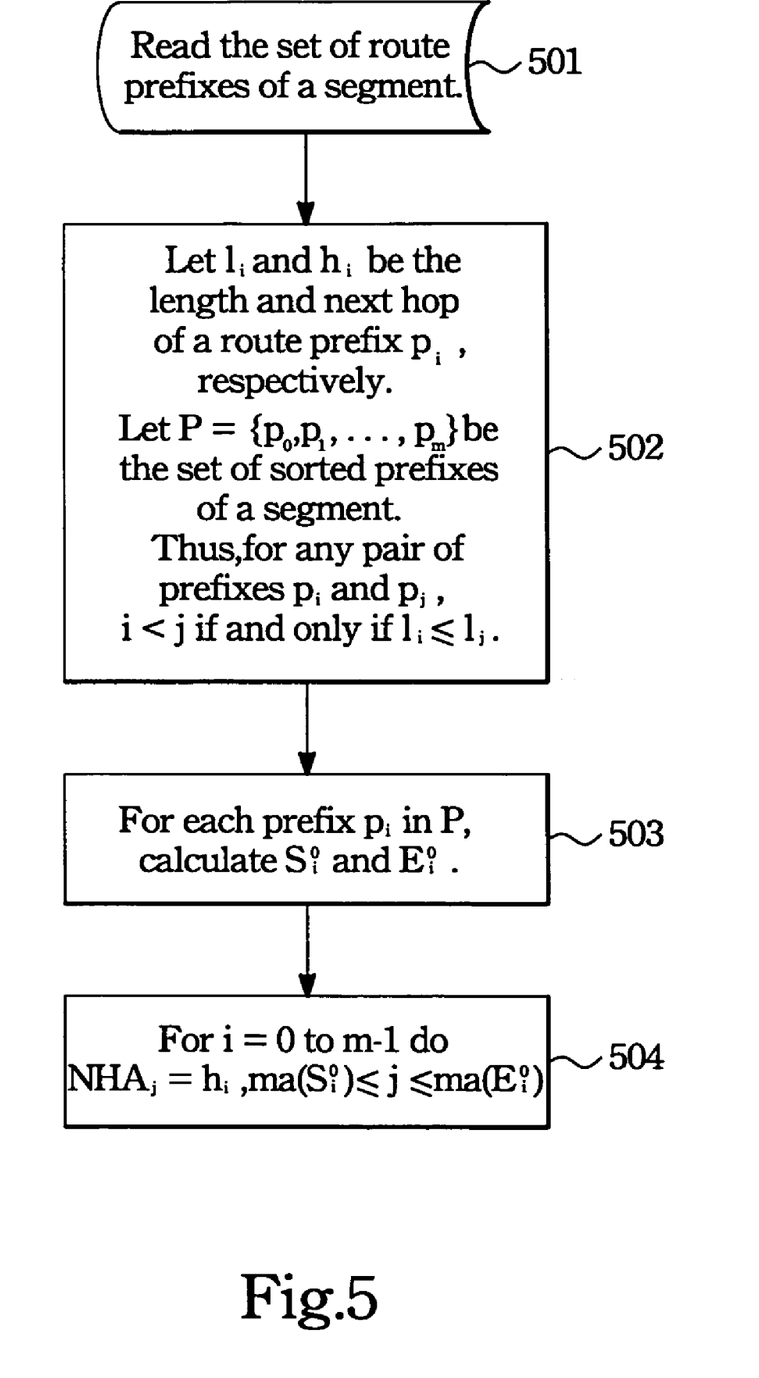
FIG. 5 is a flow chart showing the process for constructing a Next Hop Array according to the preferred embodiment of the present invention.

The construction of the NHA depends on the prefix-set of the segment and the length of each prefix in the prefix-set. Refer to FIG. 5 for the steps of constructing the NHA of a segment:

Step 501: Start and read the set of route prefixes of a segment.

Step 502: Let $l_i$ and $h_i$ be the length and next hop of a route prefix $p_i$, respectively. Let $P=\{p_0, p_1, \ldots, p_{m-1}\}$ be the set of sorted prefixes of a segment. Thus, for any pair of prefixes pi and $p_j$, i≦j if and only if $l_i \leq l_j$.

Step 503: After the set P has been sorted, for each prefix $p_i$ in P, calculate $S_i^0$ and $E_i^0$ in the memory address.

Step 504: For each element in the set P, assign the next hop $h_i$ of a prefix $p_i$ to each corresponding memory address j of the Next Hop Array ($NHA_j$), where i is from 0 to m−1 and $ma(S_i^0) \leq j \leq ma(E_i^0)$.

The object of these steps is to rearrange the route prefixes according to their orders in the set P in the memory. Suppose an IP address has a segment which consists of multiple route prefixes $p_i$ representing multiple subnets. Each route prefix $p_i$ can be assigned with a next hop $h_i$. Let $o_i=l_i-16$ and $k=\max\{o_i|p_i \epsilon P\}$ (NHA is of size $2^k$).

Let $P=\{p_0, p_1, \ldots, p_{m-1}\}$ be the set of sorted prefixes of a segment. Thus, for any pair of prefixes $p_i$ and $p_j$, i is less than j if and only if $l_i$ is less or equal to $l_j$.

For each prefix $p_i$ in P, let $S_i^0$ and $E_i^0$ denote the data structure of the start point and end point of prefix $p_i$, respectively. Moreover, let $ma(S_i^0)$ and $ma(E_i^0)$ be the memory addresses of $S_i^0$ and $E_i^0$ in the NHA, respectively. The addresses ranging from start address $ma(S_i^0)$ and end address $ma(E_i^0)$ of prefix $p_i$ should be forwarded to next hop $h_i$. Also let $op(S_i^0)$ and $op(E_i^0)$ be the output ports (next hops) of the destination addresses of the start point and the end point, respectively.

Assume prefix $p_i$ of an IP address be a.b.x.y. Let $x_0, x_1, x_2, \ldots, x_{15}$ represent the binary form of x.y, and $s_0, s_1, s_2, \ldots, s_{k-1}$ the start address mask, where $s_j=1, j<o_i$, and $s_j=0$, $j \geq o_i$, and $e_0, e_1, e_2, \ldots, e_{k-1}$ the end address mask, where $e_j=0, j<o_i$, and $e_j=1, j \geq o_i$. Thus, $$ma(S_i^0)=(x_0, x_1, x_2, \ldots, x_{k-1} \text{ AND } s_0, s_1, s_2, \ldots, s_{k-1}),$$
and $$ma(E_i^0)=(x_0, x_1, x_2, \ldots, x_{k-1} \text{ OR } e_0, e_1, e_2, \ldots, e_{k-1}).$$

For example, assume $p_i$=a.b.58.0, $l_i$=26, and k=12 (the longest prefix in this segment is 28 bits). Then, the binary form of 58.0 (k-bit)=001110100000, $s_0, s_1, s_2, \ldots, s_{k-1}$=111111111100, and $e_0, e_1, e_2, \ldots, e_{k-1}$=000000000011. We have $$ma(S_i^0)=001110100\underline{000}=928 \text{ and}$$

$$ma(E_i^0)=001110100\underline{011}=931.$$

This also means that $NHA_j=h_i$, $ma(S_i^0) \leq j \leq ma(E_i^0)$.

For each prefix $p_i$ in P, we can find a pair of $S_i^0$ and $E_i^0$. The memory addresses between $ma(S_i^0)$ and $ma(E_i^0)$ can be depicted as an interval $[ma(S_i^0), ma(E_i^0)]$, and the set P of prefixes can be presented as a set of intervals.

If none of the intervals is overlapped, then we can construct the NHA directly by setting $NHA_j=h_i$, $ma(S_i^0) \leq j \leq ma(E_i^0)$. However, this may not always be the case in practical application. An overlap of intervals means there are more than one matching IP addresses.

Since the invention adopts the longest matching for the IP addresses, therefore if a memory address j belongs to a set P' of intervals simultaneously, then we should set $NHA_j=h_i$, where $p_i$ is the longest prefix of P'. For example, assume each route prefix is presented in a format like: prefix/prefix length/next hop (output port). Then the set P of six sorted prefixes {192.168/16/1, 192.168.58/18/2, 192.168.92/24/1, 192.168.58.32/26/3, 192.168.255.240/28/5, 192.168.58.36/32/8} can be presented as the six segments shown in FIG. 6A.

Figure 6A:
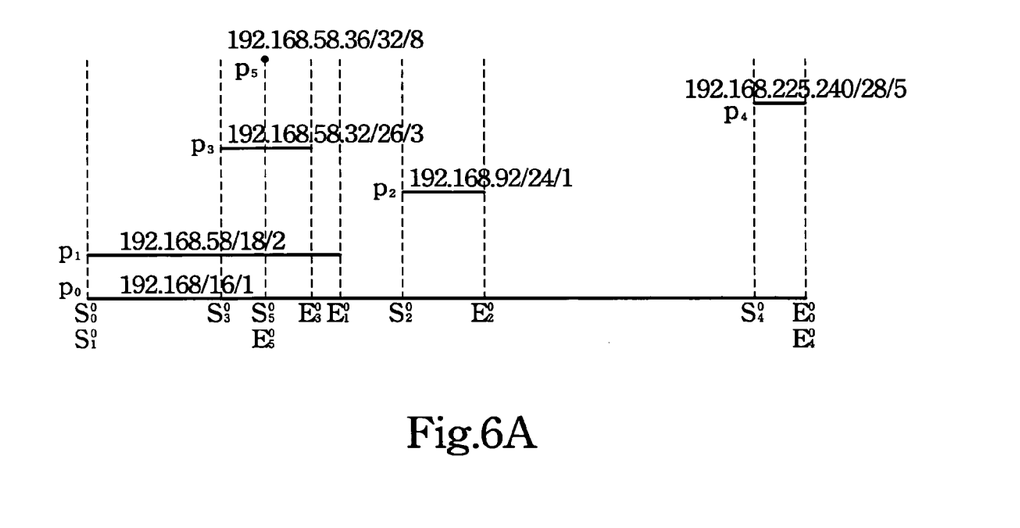
FIG. 6A is a schematic diagram showing an example of the Segment presentation of a prefix set P according to the method of the invention.

Refer to FIG. 6A, the longest prefix 192.168.58.36 is a complete IP address, so it represents a point instead of an interval. It indicates that an IP address corresponding to "192.168.58.36" will be forwarded to next hop 8. On the other hand, the prefix "192.168" represents a shortest prefix. It indicates any IP address in the subnet of 192.168 will fall within this range. If we project all the prefixes on the prefix $P_0$, we can find prefixes containing the same subnets will have overlapped parts. However, we can find the desired next hop with the longest prefix matching. The memory addresses for these prefixes are as follows:

$$ma(S_0^0)=0; ma(E_0^0)=65535$$

$$ma(S_1^0)=0; ma(E_1^0)=16383$$

$$ma(S_2^0)=23552; ma(E_2^0)=23807$$

$$ma(S_3^0)=14848; ma(E_3^0)=14911$$

$$ma(S_4^0)=65520; ma(E_4^0)=65535$$

$$ma(S_5^0)=14884; ma(E_5^0)=14884.$$

Figure 6B:
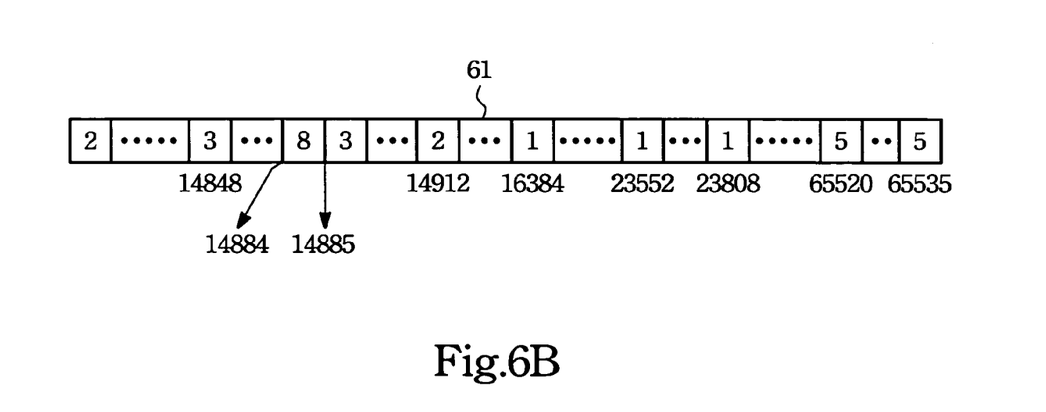
FIG. 6B is a schematic diagram showing the Next Hop Array based on the example shown in FIG. 6A.
Figure 7A:
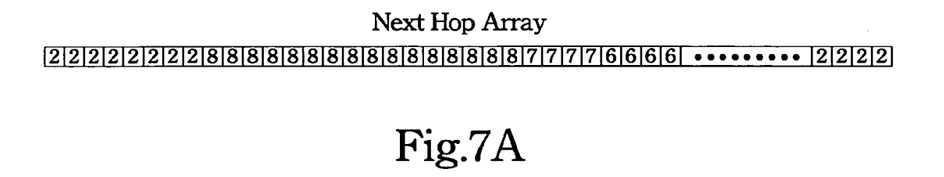
FIG. 7A is a schematic diagram showing an example for NHA compression according to the method of the invention.

Their corresponding Next Hop Array will be like the array as illustrated in FIG. 6B. The Next Hop Array 61 contains memory locations from 0 to 65535. Each location stores an output port for an IP address in the sorted prefixes. If the prefixes have overlapped portions, the NHA stores the output port for the longest prefix. Accordingly, the memory addresses from 0 to 14847 represent output ports for $P_1$, 14848–14883 for $P_3$, 14884 for $P_5$, 14885–14911 for $P_3$, and so on. Since the output ports for the IP addresses of the same prefixes will be the same, so the Next Hop Array as illustrated in FIG. 6B or 7A contains many duplicated port numbers. In the worst case, the number of memory accesses for an IP address lookup is still two for this NHA construction, but the total amount of memory required can be significantly reduced because its offset length is variable.

Figure 7B:
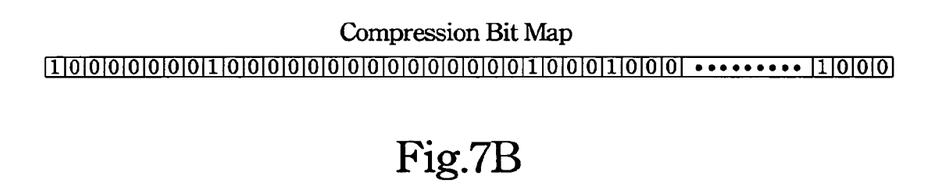
FIG. 7B is a schematic diagram showing an example for a Compression Bit Map based on the Next Hop Array of FIG. 6A according to the method of the invention.
Figure 7C:
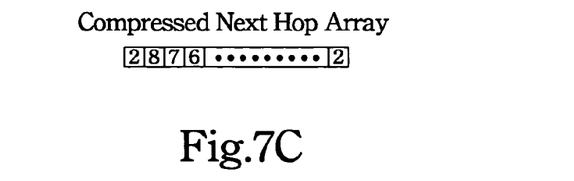
FIG. 7C is schematic diagram showing a compressed NHA based on the Compression Bit Map as shown in FIG. 7B according to the method of the present invention.

The size of the forwarding database structure, that is NHAs, can be further reduced by compression. For each segment with offset length k>3, the associated NHA can be replaced by a Code Word Array (hereinafter referred to as CWA) and a compressed NHA (hereinafter referred to as CNHA). To construct the CWA, the technique of Compression Bit Map (hereinafter referred to as CBM) is employed, one bit for each entry in the original NHA. The compression rule is as follows:

Let $a_i$ denote the value (port number) of the i-th entry of the NHA, $b_i$ stand for the corresponding bit in the CBM, and $c_j$ denote the value (port number) of the j-th entry of the CNHA. Initially, $c_0=a_0$, $b_0=1$, and $j=1$. Then scan the NHA from left to right. If $a_{i+1}=a_i$, then $b_{i+1}=0$, else $b_{i+1}=1$, $c_j=a_{i+1}$, and $j=j+1$. Following this process, every first occurrence of a port number of a prefix in the NHA will be marked as "1" in the CBM (CBM). For example, the first occurrence of "2", "8", "7", "6", ..., "2" in the NHA as shown in FIG. 7A can be marked by a CBM as shown in FIG. 7B. The rest are marked as "0" in the CBM. Consequently, combining the NHA as shown in FIG. 7A and CBMA as shown in FIG. 7B can get the Compressed NHA (CNHA) as shown in FIG. 7C. The CBM illustrated in FIG. 7B later on can be used to decode the CNHA as illustrated in FIG. 7C.

Figure 8:
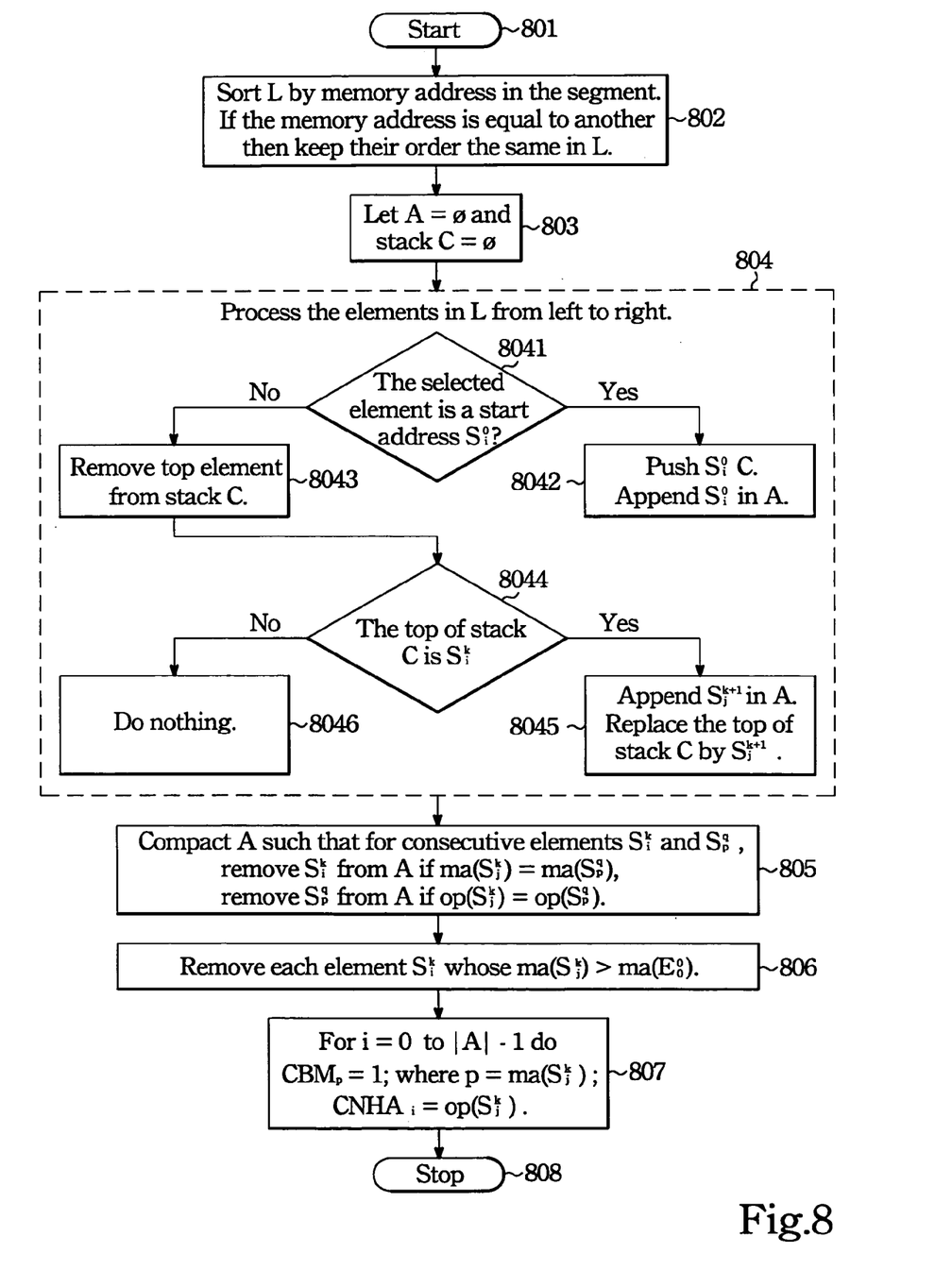
FIG. 8 is a flow chart showing the process for constructing a Compression Bit Map and a compressed NHA according to the method of the present invention.

In addition to the method stated above for constructing the CBM and CNHA, the present invention also provides another method which can construct the CBM and CNHA of a segment directly without constructing the NHA first. The method is illustrated in FIG. 8.

Step 801: Start and read the set P of route prefixes of a segment, $P=\{p_0, P_1, \ldots P_{m-1}\}$, where each element in the set is sorted in an increasing order by the length of prefixes. Each pair of start point and end point of each route prefix is sorted according to their order in set P. The sorted list will be $L=\{S_0^0, E_0^0, S_1^0, E_1^0, \ldots, S_{m-1}^0, E_{m-1}^0\}$:

Step 802: Sort elements in the list L in an increasing order according to their memory addresses in the segment. If two elements have the same memory address, then refer to their sequential orders as in the list L.

Step 803: initialize an array $A=\phi$ and stack $C=\phi$.

Step 804: Process the elements in the list L from left to right and for each element executes the following steps 8041 to 8046:

Step 8041: Check if the selected element is a start point $S_i^0$? "i" represents the i-th route prefix. If yes, go to step 8042. If not, go to step 8043.

Step 8042: Push $S_i^0$ onto stack C. Append $S_i^0$ to array A. Step 8041 to step 8046 are finished. Repeat step 8041 to step 8046 until each element has been processed.

Step 8043: Remove the top element from stack C.

Step 8044: Check if the top element of stack C is $S_j^k$? "$S_j^k$" means that the start point of the j-th route prefix in the set has been updated k times in the memory. If yes, go to step 8045. If not, go to step 8046.

Step 8045: Append $S_j^{k+1}$ to A, where $op(S_j^{k+1})=op(S_j^k)$, $ma(S_j^{k+1})=ma(E_i^0)+1$. And Replace the top element of stack C with $S_j^{k+1}$. Step 8041 to step 8046 are finished. Repeat step 8041 to 8046 until all the elements have been processed.

Step 8046: Do nothing. Step 8041 to step 8046 are finished. Repeat step 8041 to step 8046 until all the elements have been processed.

Step 805: Compact the array A such that for consecutive elements $S_j^k$ and $S_p^q$, remove $S_j^k$ from array A if $ma(S_j^k)=ma(S_p^q)$, remove $S_p^q$ from array A if $op(S_j^k)=op(S_p^q)$.

Step 806: Remove each element $S_j^k$ from array A where $ma(S_j^k)>ma(E_0^0)$.

Step 807: For each start point in the array A, assign "1" to the corresponding bit of the Compression Bit Map, and assign its output port to the corresponding entry of the Compressed Next Hop Array.

Step 808: Stop.

The time complexity of the proposed CBM and CNHA constructing method is O(nlogn), where n is the number of prefixes in a segment. Since this algorithm constructs the CBMs and CNHAs directly from the given prefixes, the forwarding table can be built in a very short time.

After obtaining the CNHA, the CBM can not directly be used to decode the CNHA for looking up the output port for each IP address. The CBM should be encoded as a sequence of code words (hereinafter referred to as CWA). The length of the code words depends on application. According to the preferred embodiment of the present invention, a code word of 32-bit is used. However, a code word of 16-bit or any suitable numbers may also be used.

Figure 9:
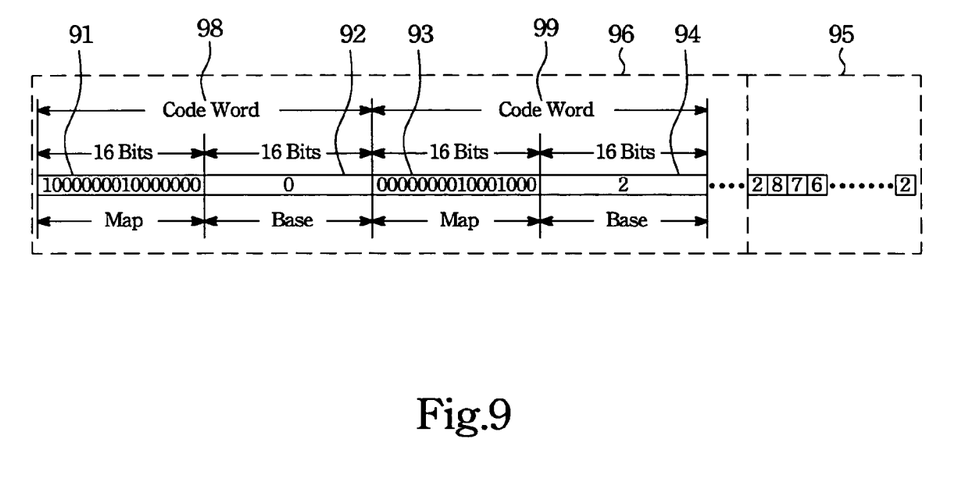
FIG. 9 is a schematic diagram showing an example of the Code Word Array according to the method of the present invention.

Refer to FIG. 9, it shows a CWA 96 followed by a CNHA 95. The CBM is treated as a bit-stream and partitioned into a sequence of 16-bit maps. These maps are sequentially put into the code words 98, 99, one for each code word. The CWA 96 consists of multiple code words. Each code word consists of a map (16-bit) 91 and a base (16-bit) 92. Refer to FIG. 9, the base of each code word is equal to the number of "1"s accumulated in the maps of previous code words. It indicates the number of occurrences for different port numbers up to the code word just found. For example, the CBM shown in FIG. 7B is encoded as the Code Word Array 96 depicted in FIG. 9. The maps 91, 93 of the first two code words 98, 99 are "1000000010000000" and "0000000010001000", respectively. For the first code word 98, the base 92 has a value of zero because it is the first code word. For the second code word 99, the base 94 has a value of "2" because its previous map 91 has two "1"s.

Accordingly, the base of each code word is used to indicate the start entry of the associated CNHA. For an offset value q, the output port can be computed as follows: Let $cw_s=map_s+base_s$ be the code word containing this offset, where $s=(q \text{ DIV } 16)$. Let $w=(q \text{ MOD } 16)$ denote the corresponding bit of q in maps and |w| represent the number of accumulated "1"s from the 0-th bit to the w-th bit of maps. Then, the output port of an offset value q can be calculated as $$op_q = CHNA_t, \text{ where } t=base_s+|w|-1.$$

Take the examples shown in FIGS. 7B, 7C and FIG. 9 again for illustration. For offset q=8, we have s=0, w=8, and |w|=2, then $t=(base_0+|w|-1)=0+2-1=1$ and the corresponding output port is the second entry in $CNHA_1$ which is port 8. For offset value q=25, we have s=1, w=9, and |w|=1, then $t=(base_1+|w|-1)=2+1-1=2$. The corresponding output port is the third entry in $CNHA_2$ which is port 7.

To update the forwarding table, we can either rebuild a new one in a short time or through special hardware design, such as dual-port memory or dual-memory banks.

Figure 10:
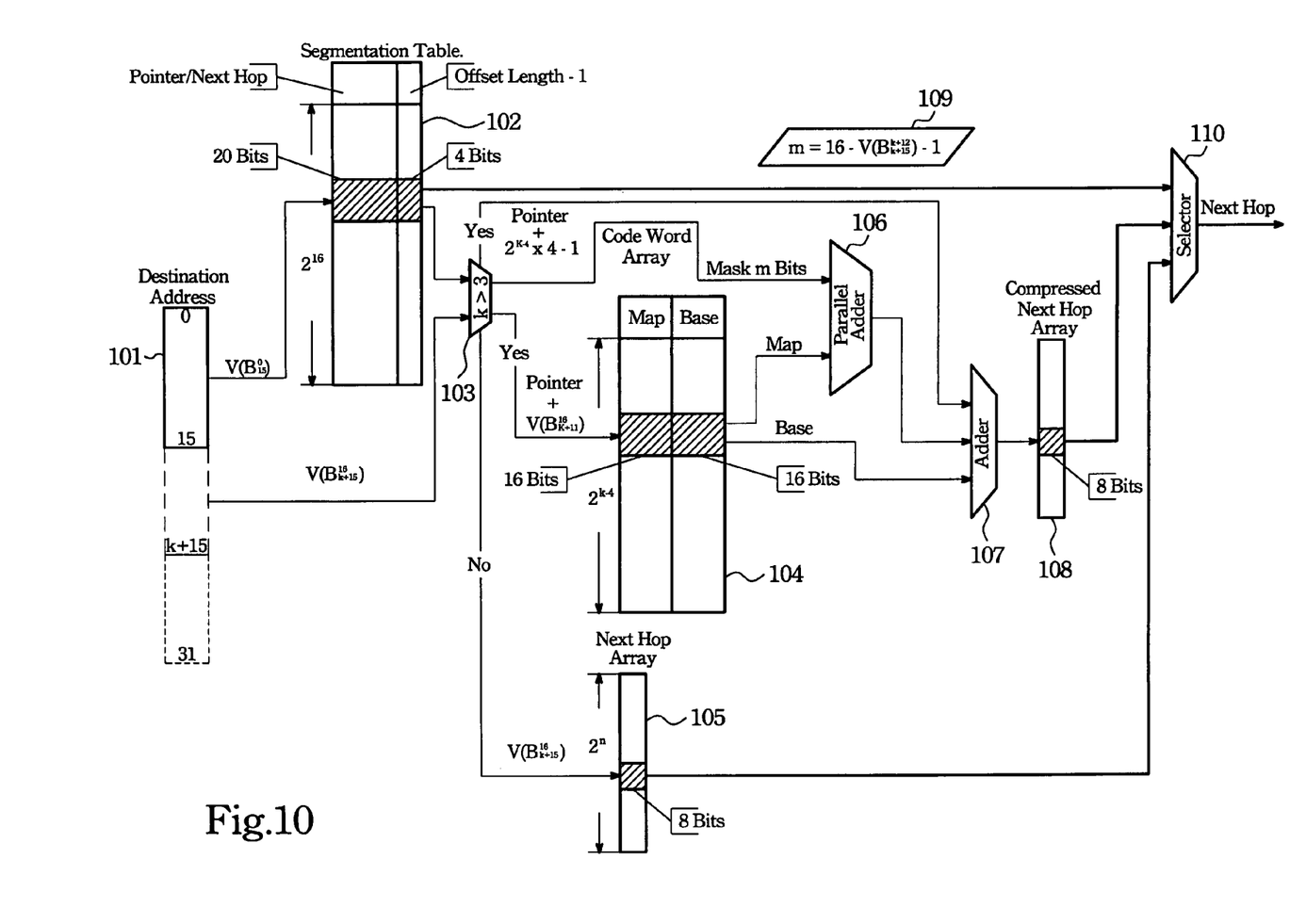
FIG. 10 is a block diagram of the hardware architecture showing the preferred embodiment of the present invention.

The high-level hardware implementation according to the preferred embodiment of the present invention is shown in FIG. 10. Refer to FIG. 10, the first 16 bits (bits 0~15) of an incoming IP address 101 are used as an index to look up the Segment Table 102 which is 64K. Each entry of the Segmentation Table storage device 102 has a length of 24 bits. The corresponding entry of the Segment Table storage device 102 records either the next hop (the value of left 20 bits<256) of this destination IP address, or a pointer (20-bit) pointing to the starting address of the CWA storage device 104 or the NHA storage device 105, and an offset length of the actual offset length minus 1 (k-1, 4-bit). For each segment, if the offset length k>3, then we need to decode the CNHA storage device 108 by searching the CWA storage device 104 (with $2^{k-4}$ entries) and finding the associated code word. To decode the code word, using the $16^{th}$ bit to the $k+15^{th}$ bit of the destination IP address as an index to look up the code word in the Code Word Array. From the code word found, the map and base can indicate the location of the port number in the CNHA storage device 108.

Since the CNHA storage device 108 is located immediately after the CWA storage device 104, the starting address of CNHA storage device 108 is equal to (the pointer+$2^{k-4} \times 4 - 1$). An adder 107 is designed to add this with base and |w|.

If k≦3 (the offset length less than 4 bits), then the k bits, starting from the 16-th bit of the destination IP address 101, are used as the index of the NHA storage device 105 (with $2^k$ entries) to find the output port.

The value of |w| can be computed by a parallel adder 106. For example, assume for a segment with offset length k is 8 and a destination IP address is a.b.177.y with offset of 177. Then we should search the s-th code word, where s is equal to 11 (177 DIV 16). Assume the map of this code word is 1 <u>0</u>00100011000100, then the bit position for this offset will be 1 (177 MOD 16).

Let $B_i^j$ denote the bit stream from the j-th bit to i-th bit of an IP address 101 and $V(B_i^j)$ stand for the value of bit stream $B_i^j$. To compute the value of |w|, we can first mask the right $16 - V(B_{k+15}^{k+12}) - 1$ bits of the code word into zero and then calculate the number of "1"s in this masked code word by the parallel adder 106 in constant time.

Figure 11:
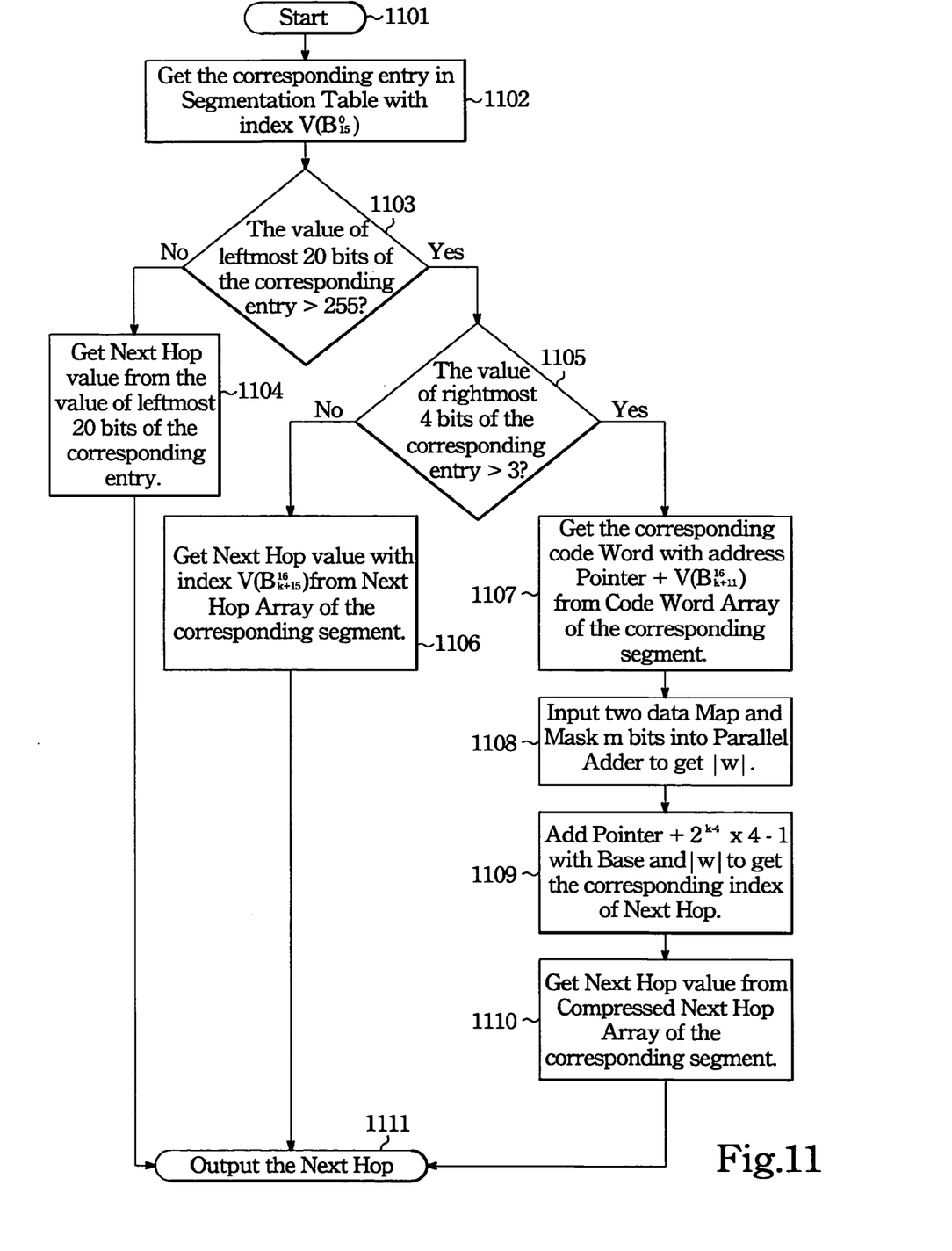
FIG. 11 is flow chart showing the method for looking up a next hop according to the architecture as shown in FIG. 10.

According to the architecture as shown in FIG. 10, the next hop can be found by following the steps as shown in FIG. 11. Refer to FIG. 11, Step 1101: Start. Here an IP address of 32 bits is used as an example for illustration.

Step 1102: Let $B_i^j$ represent the jth to ith bits of an IP address. $V(B_i^j)$ be the value of $B_i^j$. Use $V(B_{15}^0)$ as an index to look up the entry in the segmentation table.

Step 1103: Determine if the leftmost 20 bits of the corresponding entry is larger than 255? If yes, go to step 1105. If not, go to step 1104.

Step 1104: Since the entry is an output port, so get the next hop value directly from the value of the leftmost 20 bits of the corresponding entry. And go to step 1111.

Step 1105: Determine if the value of the rightmost 4 bits of the corresponding entry is larger than the value of 3 bits? If yes, go to step 1107. If not, go to step 1106.

Step 1106: Use $V(B_{k+15}^{16})$ as an index to look up the Next Hop Array. And go to step 1111.

Step 1107: The corresponding entry is a pointer. So, use the pointer+$V(B_{k+11}^{16})$ as an index to find the corresponding code word from the Code Word Array of the corresponding segment.

Step 1108: Input two data Map and Mask m bits into the parallel adder to get the value of |w| where |w| means the number of "1"s accumulated from the 0-th bit to the w-th bit.

Step 1109: Compute the index for looking up the CNHA by adding (pointer+$2^{k-4} \times 4 - 1$), Base and |w|.

Step 1110: Lookup the next hop value from the CNHA according to the index computed in step 1109.

Step 1111: output the next hop.

For current ASIC technology, the parallel adder 106 in FIG. 10 takes no more than 8 ns. In FIG. 10, the length of the code word is 32-bit and is identical to that of the data bus. In other words, it only needs one memory access to obtain a code word in the CWA storage device 104. For a destination IP address a.b.x.y, the segment a.b ($V(B_{15}^0)$) is first used as the index to look up the Segmentation Table storage device 102. If the offset length k of this segment is less than or equal to 3, then we can obtain the output port from the NHA 105 directly. In this case, it takes two memory accesses. If the offset length k is greater than 3, then we use pointer+$V(B_{k+11}^{16})$ as the index to lookup the CWA storage device 104 to get the desired code word. Based on the obtained map and base of the code word, we can compute the address of the output port in the CNHA storage device 108. In this case, it takes three memory accesses to get the output port.

To sum up, the lookup scheme according to the preferred embodiment of the invention also provide a forwarding table having the size ranging from 450 Kbytes to 470 Kbytes. Moreover, most of the lookup can be done by only one memory access. In the worst case, the number of memory accesses required for a lookup is three. When implemented in a pipeline skill in hardware, the preferred embodiment of the invention as shown in FIG. 10 can achieve one routing lookup for each memory access. This small forwarding table is very suitable to be implemented in faster SRAM. With current 10 ns SRAM, this mechanism furnishes approximately $100 \times 10^6$ routing lookups per second. The implementation cost is also very low. With current 10 ns SRAM, the present invention furnishes approximately $100 \times 10^6$ routing lookups per second. This speed is much faster than any routing lookup schemes available on the market. Moreover, based on the proposed algorithm, the CBM and CNHA of a segment can be constructed in O(nlogn) time; where n is the number of prefixes in the segment. Thus, The invention can update the forwarding table in a quick and efficient way. Moreover, since the forwarding table can be constructed in a short time, a new forwarding table can be rebuilt whenever necessary or be built based on the hardware of dual-port memory or dual-memory banks.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method of constructing route information for a multi-gigabit switching router comprising:

partitioning each route prefix of route information into a segment and an offset, said offset having variable length;

building a segmentation table based on said segment, said segmentation table comprising a pointer/next hop field and an offset length field;

constructing a Next Hop Array for each entry in said segmentation table when a longest prefix length of said segment is larger than a first predetermined value;

constructing a Compression Bit Map for each entry of said Next Hop Array when a value of said offset length field is larger than a second predetermined number of bits; and constructing a Code Word Array and a Compressed Next Hop Array for each said Compression Bit Map, said Code Word Array consisting of a plurality of code words each having a Map and a Base.

2. The method as claimed in claim 1, further comprising:

using a first bit stream of an IP address of an incoming IP packet as an index to look up said segmentation table;

determining whether said first bit stream of an entry of said segmentation table pointed to by said index is larger than or equal to M;

outputting said entry of said segmentation table as a next hop when said first bit stream of said entry is smaller than said M;

determining a correspondent entry of said segmentation table is a pointer pointing to a corresponding Next Hop Array when said first bit stream of said entry of said segmentation table is larger than or equal to said M, and a second bit stream of said corresponding entry of said segmentation table is smaller than or equal to Y, and using said second bit stream of said corresponding entry of said segmentation table as an index to look up said corresponding Next Hop Array.

3. The method as claimed in claim 2, wherein said first bit stream is the leftmost 20 bits, said second bit stream is the rightmost 4 bits, said M is 256, and said Y is 3.

4. The method as claimed in claim 2, further comprising:
determining a correspondent entry of said segmentation table is a pointer pointing to a corresponding Code Word Array when a first bit stream of said entry is larger than or equal to M, and a second bit stream of said correspondent entry of said segmentation table is larger than said Y;
computing an index for looking up a corresponding code word in said Code Word Array by adding said correspondent entry of said segmentation table, which is a pointer, plus said second bit stream;
computing an index for looking up a corresponding Compressed Next Hop Array by adding (said pointer+$2^{k-4}$×4−1), a Base of said corresponding Code Word and |w|, said |w| representing the number of "1"s accumulated from the 0-th bit to w-th bit of the map of the code word of said corresponding Code Word Array, said k representing an offset length.

5. The method as claimed in claim 1, wherein said pointer/next hop field of said segmentation table is 20 bits and said offset length field is 4 bits.

6. The method as claimed in claim 1, wherein each of said Next Hop Arrays contains $2^k$ entries, and said k is determined by the longest prefix length of each segment.

7. The method as claimed in claim 1, wherein said step of constructing a Compressed Bit Map and said step of constructing a Compressed Next Hop Array can be executed at the same time.

8. The method as claimed in claim 7, comprising:
reading a set of sorted route prefixes of a segment in an increasing order by the length of prefixes, and each pair of start point and end point of said list of sorted route prefixes is sorted according to an order in said set of route prefixes of said segment;
sorting each element in said set in an order according to its memory address in said segment;
processing each element in said set from left to right and in a manner that:
(a) determining if a selected element is a start point $S_i^0$, where "i" represents the i-th route prefix in said set and "0" represents a number of update times of said start point in the memory; when said selected element is a start point $S_i^0$, executing step (b), and when said selected element is not a start point $S_i^0$, executing step (c);
(b) pushing said start point $S_i^0$ onto a stack, and appending said start point $S_i^0$ to an array; and repeating said step (a) until each element in said set is processed;
(c) removing a top element of said stack;
(d) determining if the top element of said stack is a start point $S_j^k$, where "j" represents the j-th route prefix in said set and "k" represents the number of update times of said start point in the memory; when said top element is said start point $S_j^k$, executing step (e), and when said top element is not said start point $S_j^k$, executing step (f);
(e) appending $S_j^{k+1}$ to said array where the next hop of a start point $s_j^{k+1}$ is equal to the next hop of a start point $S_j^k$, and a memory address of a start point $S_j^{k+1}$ is equal to a memory address of an end address $E_1^0+1$; and replacing the top element of said stack with said start point $S_j^{k+1}$; and repeating said step (a) until each element in said set is processed;
(f) executing nothing; and repeating said step (a) until each element in said set is processed;
compacting said array in a manner that for any consecutive element $S_j^k$ and $S_p^q$, removing $S_j^k$ from said array if the memory address of said start point $S_j^k$ is equal to the memory address of said start point $S_p^q$, and removing said start point $S_p^q$ from said array if the next hop of said start point $S_j^k$ is equal to said next hop of said start point $S_p^q$;
removing each element $S_j^k$ from said array when said memory address of said start point $S_j^k$ is equal to the memory address of the end point $E_0^d$; and
concurrently constructing a Compression Bit Map Array and a Compressed Next Hop Array by assigning "1." for each start point in said array to generate said Compression Bit Map Array and assigning a next hop of said start point in said array to each corresponding entry of the Compressed Next Hop Array to generate said Compressed Next Hop Array.

9. The method as claimed in claim 1, wherein said first predetermined value is 16 and said second predetermined number of bits is 3.

10. An IP routing lookup system for a multi-gigabit switching router comprising:
means for partitioning an incoming IP address into a segment portion and an offset of variable length portion;
means for storing a segmentation table, said segmentation table comprising a pointer/next hop field and an offset length field, and said segmentation table storing means coupled to said partitioning means for looking up an entry in said segmentation table using said segment portion as an index;
means for storing a plurality of Next Hop Arrays and capable of outputting a next hop in response to an index;
means for storing a plurality of Code Word Arrays, each Code Word Array consisting of a plurality of code words and each code word comprising a Map and a Base for indexing a Compressed Next Hop Array;
first adding means for adding a plurality of mask bits of Map bits of a corresponding code word and generating the value of |w|, said |w| representing the number of "1"s accumulated from the 0-th to w-th bit of said code word of said corresponding Code Word Array;
second adding means for adding a pointer read from the pointer/next hop field of said segmentation table plus a parameter, said base, and said |w| to generate a second index pointing to said Compressed Next Hop Array;
means for generating a next hop from said Compressed Next Hop Array in response to said second index;
means for determining (1) whether the first bit stream of an entry of said segmentation table is larger than or equal to M, (2) whether said first bit stream of an entry of said segmentation table is larger than or equal to said M and the second bit stream of an entry of said segmentation table is larger than Y, and (3) whether the first bit stream of an entry of said segmentation table is larger than or equal to said M and the second bit stream of an entry of said segmentation table is smaller than or equal to Y; and means for selecting an output from said segmentation table, said Next Hop Array, and said Compressed Next Hop Array in response to a determination of said determining means, whereby in said condition (1) selecting output from said segmentation table, in said condition (2) selecting output from a corresponding Compressed Next Hop Array, and in said condition (3) selecting output from a corresponding Next Hop Array.

11. The system as claimed in claim 10, wherein said segment portion is 16 bits and said offset of variable length portion is less than or equal to 16 bits.

12. The system as claimed in claim 10, wherein said first bit stream is the leftmost 20 bits, said second bit stream is the rightmost 4 bits, said M is 256, and said Y is 3.

13. The system as claimed in claim 10, wherein said pointer/next hop field of said segmentation table is 20 bits and said offset length field is 4 bits.

14. The system as claimed in claim 10, wherein each of said Next Hop Arrays contains $2^k$ entries, and k is determined by a longest prefix length of each segment.

15. The system as claimed in claim 10, wherein said Map is 16 bit and said Base is 16-bit.

16. The system as claimed in claim 10, wherein each entry of said Compressed Next Hop Array is 8-bit, and each entry of said Next Hop Array is 8-bit.

17. A method of constructing route information for a multi-gigabit switching router comprising:

partitioning each route prefix of route information into a segment and an offset, said offset having a variable length;

building a segmentation table based on said segment, said segmentation table comprising a pointer/next hop field and an offset length field;

constructing a Next Hop Array for each entry in said segmentation table when a longest prefix length of said segment is larger than a first predetermined value;

constructing a Compression Bit Map for each entry of said Next Hop Array when a value of said offset length field is larger than a second predetermined number of bits;

constructing a Code Word Array and a Compressed Next Hop Array for each of said Compression Bit Map, said Code Word Array consisting of a plurality of code words each having a Map and a Base;

using a first bit stream of an IP address of an incoming IP packet as an index to look up said segmentation table;

determining whether said first bit stream of an entry of said segmentation table pointed to by said index is larger than or equal to M;

outputting said entry of said segmentation table as a next hop when said first bit stream of said entry is smaller than said M;

determining said correspondent entry of said segmentation table is a pointer pointing to a corresponding Next Hop Array when said first bit stream of said entry of said segmentation table is larger than or equal to said M, and said second bit stream of said corresponding entry of said segmentation table is smaller than or equal to Y, and using said second bit stream of said corresponding entry of said segmentation table as an index to look up said corresponding Next Hop Array;

determining said correspondent entry of said segmentation table is a pointer pointing to a corresponding Code Word Array when said first bit stream of said entry is larger than or equal to said M, and said second bit stream of said correspondent entry of said segmentation table is larger than said Y;

computing an index for looking up a corresponding code word in said Code Word Array by adding said correspondent entry of said segmentation table, which is a pointer, plus said second bit stream; and computing an index for looking up a corresponding Compressed Next Hop Array by adding (said pointer+$2^{k-4}$×4−1), a Base of said corresponding Code Word and |w|, said |w| representing the number of "1"s accumulated from the 0-th to w-th bit of said corresponding Code Word Array, and said k representing an offset length.

18. The method as claimed in claim 17, wherein said first predetermined value is 16, said second predetermined number of bits is 3, said first bit stream is the leftmost 20 bits, said M is 256, said second bit stream is the rightmost 4 bits, and said Y is 3.

19. The method as claimed in claim 17, wherein said pointer/next hop field of said segmentation table is 20 bits and said offset length field is 4 bits.

20. The method as claimed in claim 17, wherein each of said Next Hop Arrays contains $2^k$ entries, where k is determined by the longest prefix length of each segment.

* * * * *